(12) United States Patent
Sandhaus et al.

(10) Patent No.: US 12,542,726 B2
(45) Date of Patent: *Feb. 3, 2026

(54) METHOD AND SYSTEM TO MIRROR TELEMETRY DATA

(71) Applicant: MELLANOX TECHNOLOGIES, LTD., Yokneam (IL)

(72) Inventors: Ran Sandhaus, Tel Aviv Yafo (IL); Vladimir Shalikashvili, Petah-Tiqwa (IL); Zachi Binshtock, Hod-Hasharon (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/611,680

(22) Filed: Mar. 20, 2024

(65) Prior Publication Data

US 2024/0235970 A1    Jul. 11, 2024

Related U.S. Application Data

(63) Continuation of application No. 17/825,792, filed on May 26, 2022, now Pat. No. 11,962,481.

(51) Int. Cl.
*H04L 43/067* (2022.01)
*H04J 3/06* (2006.01)
*H04L 43/022* (2022.01)
*H04L 43/028* (2022.01)
*H04L 43/08* (2022.01)

(52) U.S. Cl.
CPC .......... *H04L 43/067* (2013.01); *H04J 3/0667* (2013.01); *H04L 43/022* (2013.01); *H04L 43/028* (2013.01); *H04L 43/08* (2013.01)

(58) Field of Classification Search
CPC .............................. H04L 43/08; H04J 43/067
See application file for complete search history.

(56) References Cited

U.S. PATENT DOCUMENTS

| | | | |
|---|---|---|---|
| 6,359,577 B1 | 3/2002 | Weigel | |
| 6,738,349 B1 * | 5/2004 | Cen | H04L 43/00 370/413 |
| 10,530,673 B2 | 1/2020 | Dor | |
| 10,924,374 B2 | 2/2021 | Kfir et al. | |
| 10,999,366 B2 | 5/2021 | Gafni et al. | |
| 11,218,413 B2 | 1/2022 | Shpigelman et al. | |
| 11,341,412 B1 * | 5/2022 | Fornari | G06F 3/011 |
| 11,962,481 B2 | 4/2024 | Sandhaus et al. | |

(Continued)

OTHER PUBLICATIONS

Official Action for U.S. Appl. No. 17/825,792, dated Jun. 29, 2023 8 pages.

(Continued)

*Primary Examiner* — Viet D Vu
(74) *Attorney, Agent, or Firm* — Sheridan Ross P.C.

(57) ABSTRACT

Methods, systems, and computer program products to combine multiple telemetry data signals to generate a single higher resolution signal. In embodiments, the method includes: modulating a sampling of telemetry data by at least two network devices; receiving telemetry data from the at least two network devices; combining the received telemetry data; and determining a status of the network and/or network devices based on a processing of the combined telemetry data.

20 Claims, 4 Drawing Sheets

(56) References Cited

U.S. PATENT DOCUMENTS

| | | | |
|---|---|---|---|
| 2002/0093970 A1* | 7/2002 | Amit | H04L 12/2801 |
| | | | 370/386 |
| 2003/0179104 A1* | 9/2003 | Hermary | G05B 19/408 |
| | | | 340/870.16 |
| 2007/0223481 A1 | 9/2007 | Sivakumar et al. | |
| 2013/0315265 A1 | 11/2013 | Webb, III et al. | |
| 2015/0333856 A1* | 11/2015 | Hayter | H04M 1/725 |
| | | | 370/328 |
| 2015/0333992 A1* | 11/2015 | Vasseur | H04L 41/147 |
| | | | 370/252 |
| 2017/0279552 A1* | 9/2017 | Heine | H04L 43/0876 |
| 2020/0092172 A1 | 3/2020 | Kumaran et al. | |
| 2022/0271987 A1* | 8/2022 | McCallen | H04L 41/046 |
| 2023/0056759 A1* | 2/2023 | Lu | G06F 9/5088 |

OTHER PUBLICATIONS

Official Action for U.S. Appl. No. 17/825,792, dated Oct. 13, 2023 7 pages.

Notice of Allowance for U.S. Appl. No. 17/825,792, dated Dec. 22, 2023 7 pages.

* cited by examiner

METHOD AND SYSTEM TO MIRROR TELEMETRY DATA

CROSS REFERENCE TO RELATED APPLICATION

This application is a continuation of and claims priority to U.S. patent application Ser. No. 17/825,792, filed May 26, 2022, which issued as U.S. Pat. No. 11,962,481 on Apr. 16, 2024, the entire contents of which are incorporated herein by reference.

FIELD OF TECHNOLOGY

The present disclosure relates to processing telemetry data in a network device. More specifically, the present disclosure relates to exploiting dual-device data reflection to increase the resolution of telemetry data to monitor the performance of a network and/or individual devices connected to the network.

BACKGROUND

Telemetry in networking provides the ability to monitor and retrieve information (e.g., status-based and/or event-based telemetry information) from a network, for example, from one or more network devices (e.g., a switch, router, network interface card (NIC), etc.). Telemetry in networking may be used to determine the health of a network, including the health and/or performance of individual devices within the network. Telemetry allows users to pro-actively handle potential issues, debug issues, and even reprogram the network accordingly. As networks grow and data transmission rates rise, there is a challenge to provide accurate and constant telemetry data regarding networking resources (e.g., a network device) in use.

SUMMARY

Communication networks are growing in size and complexity, resulting in increased chances of device anomalies/failures that may affect network performance. Increasing the size of a network (e.g., number of devices) results in an increase in cost (e.g., monetary costs, CPU usage, network bandwidth, etc.) to monitor each device in the network. By providing higher resolution monitoring, the systems and methods disclosed herein provide more efficient network inspection, network debugging, and network tuning. Generally speaking, higher resolution monitoring can help create a more efficient and better performing network.

One type of telemetry data is data based on counters that count various events, such as the number of packets received on a port, or the number of routing accesses performed. Another type of telemetry data is based on a status (e.g., gauge) of various resources (e.g., network devices, etc.), such as current buffer fill level (e.g., buffer size), queue length, current bandwidth (BW) transmitted on a given port, etc. Yet another type of telemetry data is event-driven data, where an indication is sent upon an event occurring, such as a buffer exceeding a threshold, latency exceeding a threshold, dropped packets, etc.

The present disclosure provides an increased (e.g., doubled) sampling rate/resolution of telemetry data by sampling from connected devices, without increasing (e.g., doubling) the sampling rate per device. Some connected devices may be considered as being a "mirror image," in other words, the devices are in two places at the same time, with some predictable latency in between. An example of "mirrored" devices include port counters, which exist on both ends of a network cable, in two different, connected devices.

Assuming a negligible latency between devices as well as a negligible error rate in the infrastructure between the two "reflections" of a target signal (e.g., the signal in each of two connected devices), the signal in both devices is assumed to behave the same in reference to time. In other words, the double-rate product of the target signal may provide a good approximation of the original target signal, but in a higher resolution, sufficient to indicate the performance/health of the network and/or network devices. In embodiments, one or both of the two "reflections" may comprise only a portion of the telemetry data received. For example, the two "reflections" may be aligned so that each set of sampled telemetry data is associated with the same data traffic or operation, such that a portion of each "reflection" is not considered.

In regard to cases with non-negligible latency, the latency between a metric (e.g., a counter, gauge, etc.) in one network device and its reflection in the other network device may not be negligible. In this case, given the latency is $T_L$, and the sampling period is $T_S$, the sampler in one of the connected devices (e.g., the receiver) should be shifted by:

$$T_L + \frac{T_s}{2}$$

In embodiments, when combining the telemetry data from both network devices to generate telemetry data with double-resolution, the timestamps are aligned. For one device (e.g., the transmitter), the timestamps are taken as is. For the other device (e.g., the receiver) the timestamps are decreased by $T_L$ (in order to compensate the latency L). In embodiments, the latency between connected network devices (e.g., the two "reflections" of a sampled metric) may be derived from the cable latency and/or additional application-specific integrated circuit-(ASIC-)related latencies. In embodiments, the sampling of telemetry data in one of the connected devices may be shifted based on the determined latency.

Non-negligible infrastructure noise (e.g., erroneous/stochastic behavior within the medium between the connected network devices) may result in a deviation between the two target signals. For example, an uncorrectable bit error rate (BER) presented in the cabling may result in Tx-Rx deviation in a port counter. When there is a large deviation between the two signals, then there are two separate signals and in order to combine the two signals into a single higher resolution signal, the two signals need to be aligned in order to compensate for the deviation. In embodiments, the method and system of the present disclosure is able to detect the time intervals where the deviation is not large and can be neglected. In some embodiments, a deviation between the two signals (or other error) may indicate an error in the connection between the two devices (e.g., BER, misaligned transceivers, etc.), which requires correction/action.

The present disclosure may handle a large deviation by ignoring time windows with errors above a predetermined threshold. Ignoring time windows may require a selection of the relevant error counters related to the sampled metric, and masking and/or combining their indications together (these calculations may be done over each time window). From a modeling perspective, masking means taking the entire pool of error counters and masking out irrelevant counters (e.g., multiplication by 0); and combining means the averaging (e.g., simple average, weighted average, cost function, etc.) of the relevant error counters together into a single value (e.g., representing some combined error measurement). Then, a determination is made whether the inspected time window should be filtered out.

Additionally, or alternatively, the present disclosure may handle a large deviation by similarity test using the tunable sampler shifting. In some cases, errors may not result in a deviation in the sampled metric. If the sampling of connected devices is aligned (e.g., data read from the devices is the same), so that each sample is from the same relative "time" (e.g., applying a shift of $T_L$ where L is the latency of the reflected time series), we can say there are no significant errors, hence the original signal is well reflected in the other end. In other words, the difference (some distance metric applied to the reading, for example mean square error) is smaller than a predefined threshold. So, the sampling is reconfigured (a shift of $T_L + \frac{T_s}{2}$), sample, and combine. In some embodiments the sampling comprises Double Data Rate (DDR) sampling. This test can be performed every fixed period to verify that the sampling is error free. In the case where a large deviation is detected, the method and system can ignore the previous time window and run the deviation test until deviation is reduced enough to stop ignoring the time windows.

The described techniques relate to improved methods, systems, devices, and apparatuses that support mirroring of telemetry data to synchronize and combine telemetry data from multiple network devices into a single higher resolution signal used to monitor the performance of a network and/or network device(s). By mirroring telemetry data, the present disclosure efficiently increases the resolution of telemetry data to monitor a network and/or track its resources.

A system is provided that includes: a communication interface that: provides connectivity with at least two network devices; and control logic that: modulates a sampling of telemetry data by the at least two network devices; receives telemetry data from the at least two network devices; and determines a status of the network based on a processing of the telemetry data received from the at least two network devices.

A telemetry collection device is provided that performs steps of: modulating a sampling of telemetry data by the at least two network devices; receiving telemetry data from the at least two network devices; and determining a status of the network based on a processing of the telemetry data received from the at least two network devices.

A method of telemetry is provided, the method including modulating a sampling of telemetry data by the at least two network devices; receiving telemetry data from the at least two network devices; and determining a status of the network based on a processing of the telemetry data received from the at least two network devices.

A machine-readable medium is provided having data stored thereon, which if executed by one or more processors, cause the one or more processors to: modulating a sampling of telemetry data by the at least two network devices; receiving telemetry data from the at least two network devices; and determining a status of the network based on a processing of the telemetry data received from the at least two network devices.

A method of operating a telemetry device is provided, the method including modulating a sampling of telemetry data by at least two network devices; receiving telemetry data from the at least two network devices; and determining a status of the network based on a processing of the telemetry data received from the at least two network devices.

Examples may include one of the following features, or any combination thereof.

In some examples of the method, system, and machine-readable medium described herein, determine a frequency to sample the telemetry data in each of the at least two network devices, and wherein the sampling of the telemetry data in the at least two network devices is modulating according to the determined frequency.

In some examples of the method, system, and machine-readable medium described herein, wherein the at least two network devices comprise two back-to-back connected network devices.

In some examples of the method, system, and machine-readable medium described herein, wherein the at least two network devices comprise a receiver and a transmitter that are connected to each other.

In some examples of the method, system, and machine-readable medium described herein, wherein the at least two network devices comprise port counters in two different network connected devices on each end of a network cable.

In some examples of the method, system, and machine-readable medium described herein, wherein the at least two network devices comprise logical counters.

In some examples of the method, system, and machine-readable medium described herein, wherein the at least two network devices comprise switches.

In some examples of the method, system, and machine-readable medium described herein, wherein modulating sampling of the telemetry data in the at least two network devices comprises using Precision Time Protocol (PTP) to modulate sampling in the at least two network devices, and assigning each of the at least two network devices a different time slot for sampling their respective telemetry data, and combining and interweaving telemetry data received from each of the at least two network devices in each different time slot.

In some examples of the method, system, and machine-readable medium described herein, determines if an error threshold of a time window exceeds a predetermined threshold, and if the error threshold of the time window exceeds the predetermined threshold, then the time window is filtered out and not used.

In some examples of the method, system, and machine-readable medium described herein, triggers an alert when the status of the network indicates an error condition.

In some examples of the method, system, and machine-readable medium described herein, assigning each of the at least two network devices a different time slot for sampling their respective telemetry data; and combining and interweaving the telemetry data received from each of the at least two network devices in each different time slot.

In some examples of the method, system, and machine-readable medium described herein, determines if a deviation between the telemetry data received from each of the at least two network devices exceed a threshold, then the telemetry data is not used, wherein a sampler in each of the at least two network devices is aligned to sample mirrored telemetry data according to the measured latency.

In some examples of the method, system, and machine-readable medium described herein, the telemetry data represents a queue length.

In some examples of the method, system, and machine-readable medium described herein, the telemetry data represents a buffer size.

In some examples of the method, system, and machine-readable medium described herein, the telemetry data represents a forwarding-flow load/occupancy.

In some examples of the method, system, and machine-readable medium described herein, wherein the forwarding-flow load/occupancy is measured by one of: discarded packet counter or passed packet counter.

In some examples of the method, system, and machine-readable medium described herein, transferring the telemetry data for reporting when the telemetry data exceeds a predetermined value; and further including: performing an action based on the telemetry data exceeding the predetermined value.

In some examples of the method, system, and machine-readable medium described herein, a sampling time period is based on one of: packet size, port speed, or radix of the network device.

In some examples of the method, system, and machine-readable medium described herein, performing an action based on the telemetry data exceeding the predetermined value.

DETAILED DESCRIPTION

The ensuing description provides example aspects of the present disclosure, and is not intended to limit the scope, applicability, or configuration of the claims. Rather, the ensuing description will provide those skilled in the art with an enabling description for implementing the described examples, it being understood that various changes may be made in the function and arrangement of elements without departing from the spirit and scope of the appended claims. Various aspects of the present disclosure will be described herein with reference to drawings that are schematic illustrations of idealized configurations.

Example aspects of the present disclosure provide telemetry techniques which support, in addition to device performance analysis and flow statistics, security aspects (e.g., secure traffic), improved user experience, and latency reduction. In some cases, the techniques described herein may be applied to telecommunication (e.g., fourth generation (4G) telecommunication networks, fifth generation (5G) telecommunication networks, etc.) and Internet of Things (IoT) rich environments.

Aspects of a cloud infrastructure and/or local network infrastructure may be implemented by a programmable networking infrastructure, which includes telemetry. In some examples, the programmable networking infrastructure may be implemented through Software-Defined Networking (SDN) and Network Functions Virtualization (NFV) techniques. In some aspects, the programmable networking infrastructure may support software-based flow management (e.g., management of packets associated with different packet flows).

Aspects of the disclosure are further illustrated by and described with reference to apparatus diagrams, system diagrams, and flowcharts that relate to mirroring telemetry data.

Figure 1:
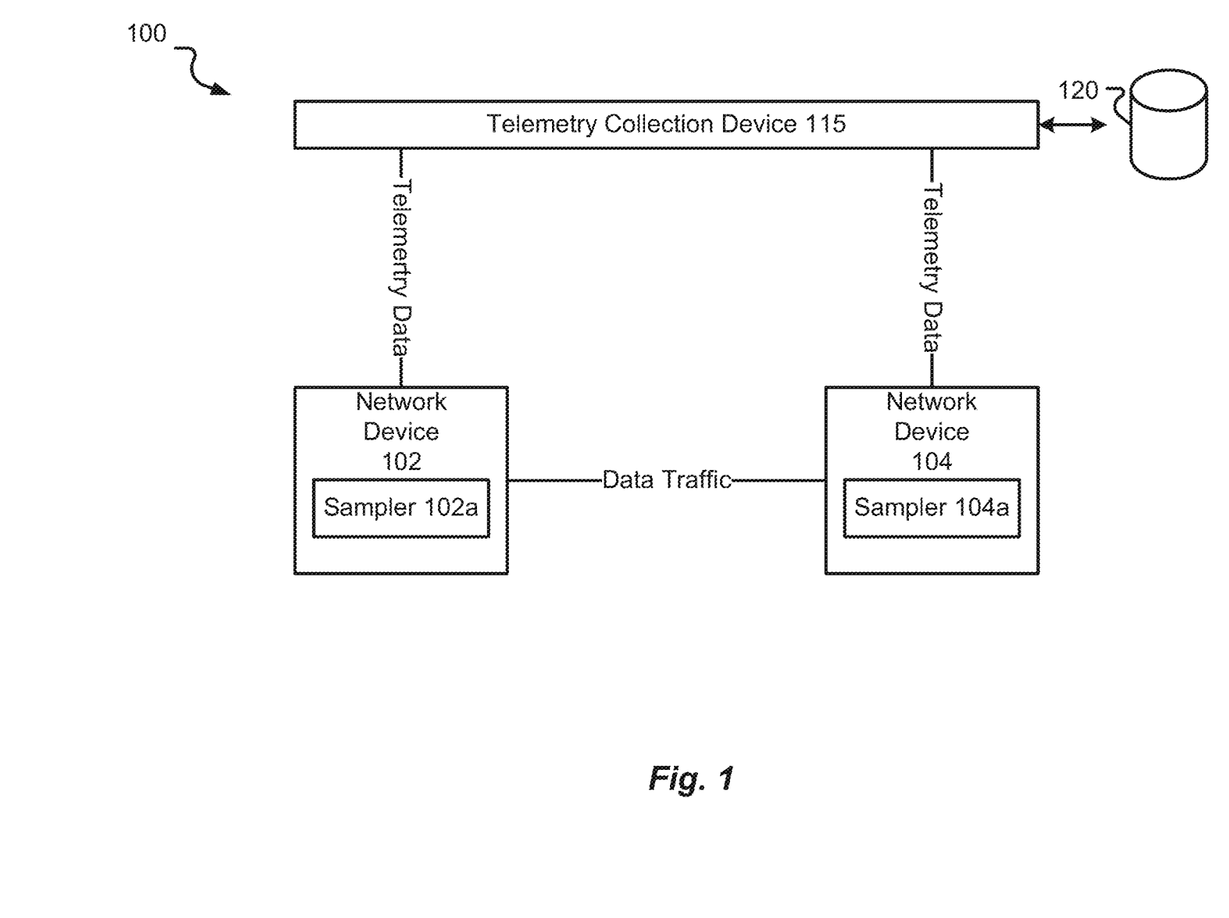
FIG. 1 illustrates an example of a system that supports mirroring telemetry data in accordance with aspects of the present disclosure.

FIG. 1 illustrates an example of system 100 that supports mirroring telemetry data in accordance with aspects of the present disclosure.

In an example, the system 100 may include a telemetry collection device 115, database/memory 120, and connected network devices 102 and 104. Network devices 102 and 104 each include a sampler 102a and 104a, respectively. In embodiments, examples of the network devices 102 and 104 include servers, endpoints, switches, routers, network interface cards (NIC), etc. In embodiments, the network devices 102 and 104 may comprise two back-to-back connected network devices (e.g., a transmitter/receiver pair, port counters in two different connected devices, etc.).

The telemetry collection device 115 may support monitoring of devices (e.g., network devices 102, 104, etc.) and data in association with monitoring security, application health, quality, and performance of the local networking infrastructure. In some cases, the telemetry collection device 115 may support monitoring of network infrastructure, storage infrastructure, and overall bandwidth capacity and consumption. In some aspects, the telemetry collection device 115 may support cloud monitoring (e.g., with respect to metrics such as cloud availability, Internet latency, outages, etc.) and routing decisions (e.g., with respect to routing data over and between any of the local networking infrastructure and the devices 102, 104, etc.).

In embodiments, the telemetry collection device 115 receives telemetry data sampled at network devices 102 and 104. For example, the sampler 102a and 104a in each network device 102 and 104, respectively, samples telemetry data, which is transferred to the telemetry collection device 115. The telemetry collection device 115 combines the telemetry data, received from the network device 102 and 104, into a single higher resolution signal representing the performance of each network device.

By combining telemetry data in "mirrored" devices, the present disclosure may increase the resolution of the telemetry data sampled without increasing the sampling rate in each device. In embodiments, the sampler 102a and 104a in each network device 102 and 104, respectively, samples telemetry data associated with the same (or approximately the same) data traffic. The interleaved alignment (shifted sampling) between the at least two network devices enables the higher resolution sampling, as if a single device was sampled at 2× resolution regarding the same traffic.

In addition to monitoring, the telemetry collection device 115 may be able to send an alert and/or instructions to the network and/or network devices 102 and 104 regarding reconfiguring the network and/or network devices 102 and 104. For example, the telemetry collection device 115 may instruct an overloaded network device to offload tasks to another network device. In another example, packets may be re-routed from an initial path across a network to an alternative path across the network.

The memory 120 may include memory local to the telemetry collection device 115. In some aspects, the memory 120 may store instructions and/or data local to the telemetry collection device 115. The memory 120 may include one or multiple computer memory devices. The memory 120 may include, for example, Random Access Memory (RAM) devices, Read Only Memory (ROM) devices, flash memory devices, magnetic disk storage media, optical storage media, solid-state storage devices, core memory, buffer memory devices, combinations thereof, and the like. The memory 120, in some examples, may correspond to a computer-readable storage media. In some aspects, the memory 120 may be internal or external to the telemetry collection device 115.

Figure 2:
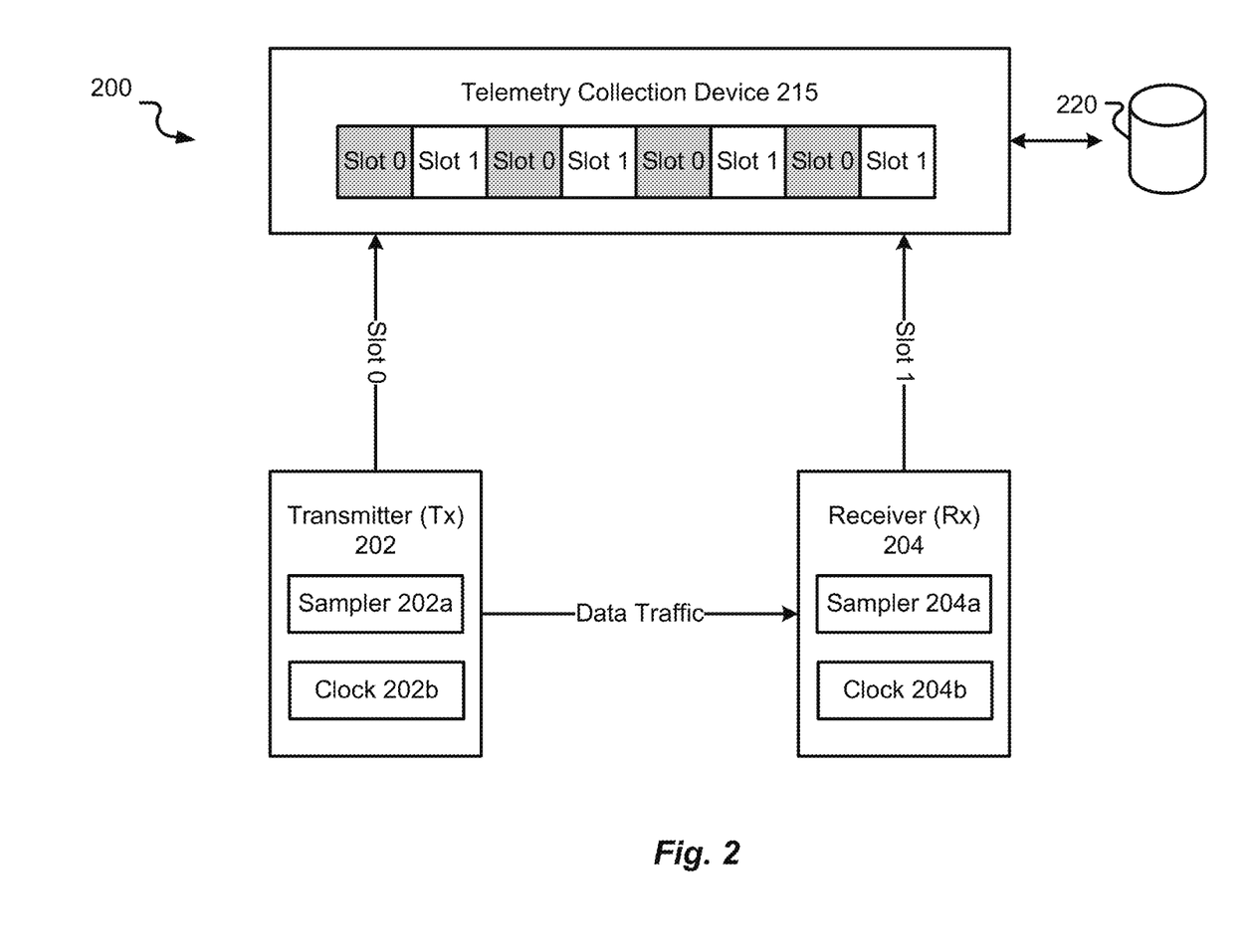
FIG. 2 illustrates another example of a system that supports mirroring telemetry data in accordance with aspects of the present disclosure.

FIG. 2 illustrates an example of a system 200 that supports mirroring telemetry data in accordance with aspects of the present disclosure. In an example, the system 200 may include a telemetry collection device 215, database/memory 220, and connected network devices 202 (Tx) and 204 (Rx). Network devices 202 and 204 each include a sampler 202a and 204a and a clock 202b and 204b, respectively. In embodiments, examples of the network devices 202 and 204 include servers, endpoints, switches, routers, NIC, etc. In the system 200, the network devices 202 (Tx) and 204 (Rx) are an example of two "mirrored" network devices that have shared metrics. For example, data from a port counter in each respective device may be combined to double the resolution of the metric.

Consider the capability of a device to sample a counter/gauge with a frequency f (this is expressed by CPU effort/telemetry bandwidth). Both a transmitter (Tx) side (e.g., 202) and receiver (Rx) side (204) is monitored. In order to provide a double data resolution, the samplers (e.g., 202a and 204a) on both ends are synchronized, such that a shift of half a period of $$f\left(\frac{1}{2f}\right)$$

is established between them—thus two interleaving time slots (e.g., slot 0 and slot 1) are formed, and each device samples their respective telemetry data in their assigned time slot.

In other words, each device 202 and 204 did not increase the rate of telemetry sampling; however, by shifting the sampling into interleaving timeslots, when the samples are streamed from each device 202 and 204 into the telemetry collection device 215, the telemetry collection device 215 combines the telemetry data from both time series (slot 0 and slot 1) into a single common, double resolution series by putting the samples from one device in an interleaved fashion with the other one (e.g., ordering the samples according to their timestamps). In embodiments, the clock 202b and 204b at each network device 202/204 may be synchronized (e.g., using PTP to synchronize the clocks 202b/204b in each device 202/204). However, clock synchronization is not required.

In embodiments, the telemetry collection device 215 may normalize the telemetry data from the samplers 202a/204a, without the need to synchronize the clocks 202b/204b. For instance, if the telemetry collection device 215 knows or can determine the latency between the devices 202 and 204, the telemetry collection device 215 may select the "mirrored" telemetry based on timestamps. In another examples, the telemetry collection device 215 may select the "mirrored" telemetry based on other data such as meta data included in the data traffic.

Figure 3:
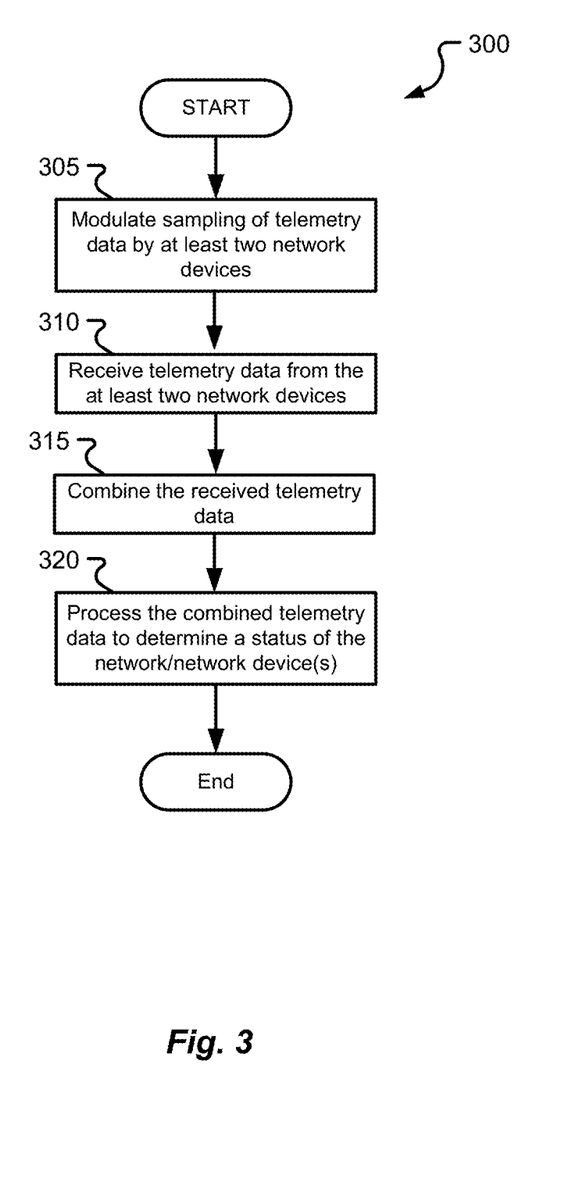
FIG. 3 illustrates an example of a process flow for mirroring telemetry data in accordance with aspects of the present disclosure.

FIG. 3 illustrates an example of a process flow 300 that supports mirroring of telemetry data in accordance with aspects of the present disclosure. In some examples, process flow 300 may implement aspects of a telemetry collection device 115, 215 and/or a device 402 described with reference to FIGS. 1-2 and 4.

In the following description of the process flow 300, the operations may be performed in a different order than the order shown, or the operations may be performed in different orders or at different times. Certain operations may also be left out of the process flow 300, or other operations may be added to the process flow 300.

In step 305, the sampling of telemetry data by at least two network devices is modulated. In embodiments, modulating the sampling of the telemetry data may comprise controlling, altering, modifying, aligning, or synchronizing the sampling of the telemetry data. For example, the telemetry collection device 115/215 controls the frequency each device (e.g., devices 102/202 and 104/204) sample their respective telemetry data. In embodiments, the telemetry collection device 115/215 assigns each device (e.g., device 102/202 and 104/204) their own respective time slot (e.g., slot 0 and slot 1) to sample their respective telemetry data. The modulation of the sampling may be done using Precision Time Protocol (PTP). In step 310, the telemetry data sampled in the at least two network devices is received.

In step 315, the received telemetry data is combined. For example, each device 102/202 and 104/204 samples and transmits the telemetry data in their respective timeslot, and the telemetry collection device 115/215 combines the telemetry data from both time series (slot 0 and slot 1) into a single common, double resolution series by putting the samples from one device in an interleaved fashion with the other one. In embodiments, the telemetry data is ordered according to their respective timestamps. The telemetry data may be associated with a performance metric (e.g., buffer size, queue length, forward-flow load/occupancy, etc.) of a network device (e.g., network devices 102/202 and 104/204).

In step 320, the combined telemetry data is used to determine performance of the network and/or of a network device (e.g., Process the combined telemetry data to determine a status of the network/network device(s)). If needed, the combined telemetry data is transferred for reporting. In embodiments, the reporting may include sending an alert or requesting instructions on reconfiguring the network.

Figure 4:
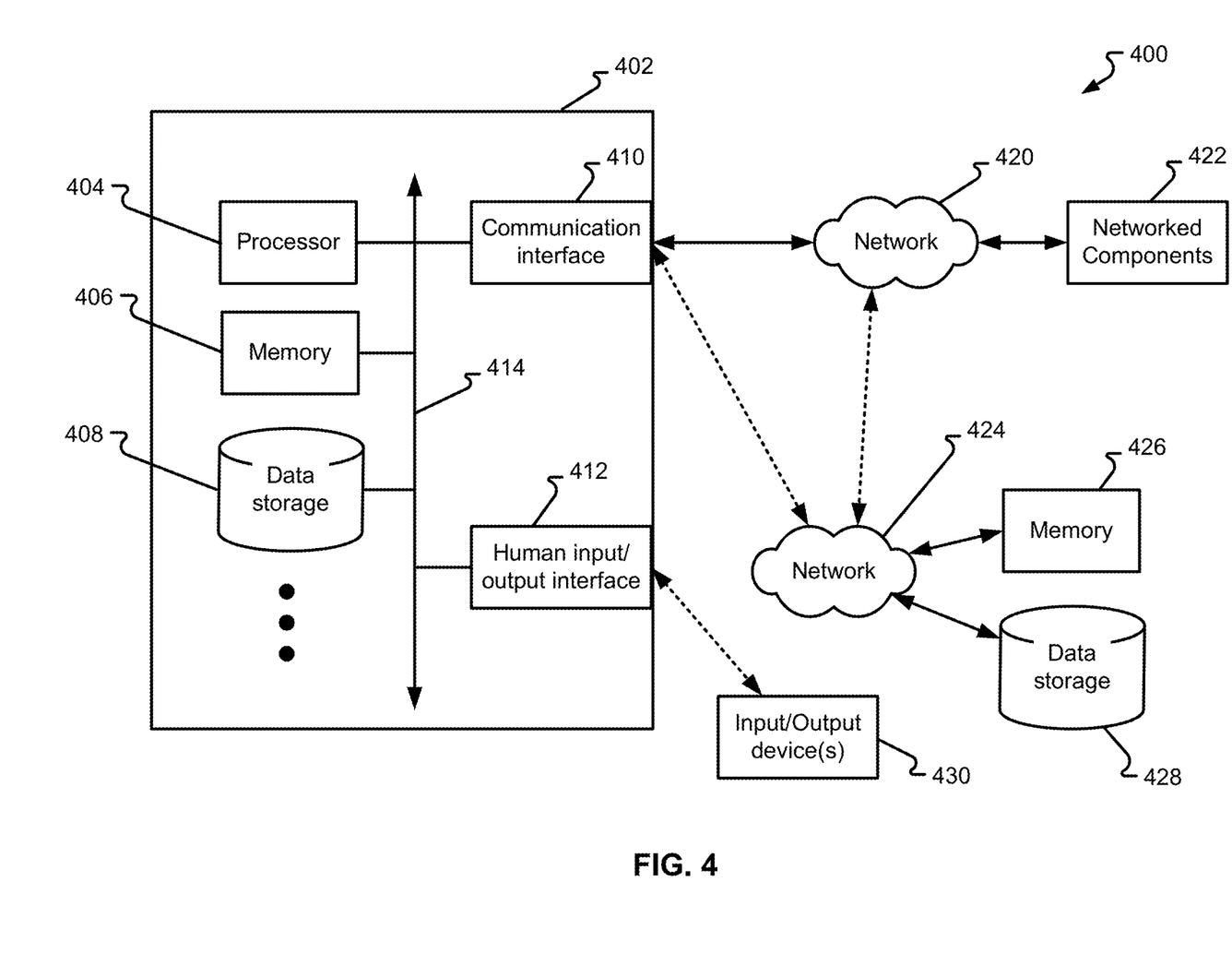
FIG. 4 illustrates an example system for mirroring telemetry data in accordance with aspects of the present disclosure.

FIG. 4 depicts device 402 in system 400 in accordance with embodiments of the present disclosure. Device 402 may be an example of the telemetry collection device 115/215.

The components are variously embodied and may comprise processor 404. The term "processor," as used herein, refers exclusively to electronic hardware components comprising electrical circuitry with connections (e.g., pin-outs) to convey encoded electrical signals to and from the electrical circuitry. Processor 404 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 414, executes instructions, and outputs data, again such as via bus 414.

In other embodiments, processor 404 may comprise a shared processing device that may be utilized by other processes and/or process owners, such as in a processing array within a system (e.g., blade, multi-processor board, etc.) or distributed processing system (e.g., "cloud," farm, etc.). It should be appreciated that processor 404 is a non-transitory computing device (e.g., electronic machine comprising circuitry and connections to communicate with other components and devices). Processor 404 may operate a virtual processor, such as to process machine instructions not native to the processor (e.g., translate the VAX operating system and VAX machine instruction code set into Intel® 9xx chipset code to allow VAX-specific applications to execute on a virtual VAX processor), however, as those of ordinary skill understand, such virtual processors are applications executed by hardware, more specifically, the underlying electrical circuitry and other hardware of the processor (e.g., processor 404). Processor 404 may be executed by virtual processors, such as when applications (i.e., Pod) are orchestrated by Kubernetes. Virtual processors allow an application to be presented with what appears to be a static and/or dedicated processor executing the instructions of the application, while underlying non-virtual processor(s) are executing the instructions and may be dynamic and/or split among a number of processors.

In addition to the components of processor 404, device 402 may utilize memory 406 and/or data storage 408 for the storage of accessible data, such as instructions, values, etc. Communication interface 410 facilitates communication with components, such as processor 404 via bus 414 with components not accessible via bus 414. Communication interface 410 may be embodied as a network port, card, cable, or other configured hardware device. Additionally, or alternatively, human input/output interface 412 connects to one or more interface components to receive and/or present information (e.g., instructions, data, values, etc.) to and/or from a human and/or electronic device.

Examples of input/output device(s) 430 that may be connected to an input/output interface include, but are not limited to, keyboard, mouse, trackball, printers, displays, sensor, switch, relay, speaker, microphone, still and/or video camera, etc. In another embodiment, communication interface 410 may comprise, or be comprised by, human input/output interface 412. Communication interface 410 may be configured to communicate directly with a networked component or utilize one or more networks, such as network 420 and/or network 424. Input/output device(s) 430 may be accessed by processor 404 via human input/output interface 412 and/or via communication interface 410 either directly, via network 424 (not shown), via network 420 alone (not shown), or via networks 424 and 420 (not shown).

Networks 420 and 424 may be a wired network (e.g., Ethernet), wireless (e.g., Wi-Fi, Bluetooth, cellular, etc.) network, or combination thereof and enable device 402 to communicate with networked component(s) 422 (e.g., automation system). In other embodiments, networks 420 and/or 424 may be embodied, in whole or in part, as a telephony network (e.g., public switched telephone network (PSTN), private branch exchange (PBX), cellular telephony network, etc.).

Components attached to network 424 may include memory 426 and data storage 428. For example, memory 426 and/or data storage 428 may supplement or supplant memory 406 and/or data storage 408 entirely or for a particular task or purpose. For example, memory 426 and/or data storage 428 may be an external data repository (e.g., server farm, array, "cloud," etc.) and allow device 402, and/or other devices, to access data thereon. Each of memory 406 and data storage 408, memory 426, data storage 428 comprise a non-transitory data storage comprising a data storage device.

Any of the steps, functions, and operations discussed herein can be performed continuously and automatically.

The exemplary apparatuses, systems, and methods of this disclosure have been described in relation to examples of a telemetry collection device 115. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

It will be appreciated from the descriptions herein, and for reasons of computational efficiency, that the components of devices and systems described herein can be arranged at any appropriate location within a distributed network of components without impacting the operation of the device and/or system.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

While the flowcharts have been discussed and illustrated in relation to a particular sequence of events, it should be appreciated that changes, additions, and omissions to this sequence can occur without materially affecting the operation of the disclosed examples, configuration, and aspects.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more examples, configurations, or aspects for the purpose of streamlining the disclosure. The features of the examples, configurations, or aspects of the disclosure may be combined in alternate examples, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed example, configuration, or aspect. Thus, the following claims are hereby incorporated into this Detailed Description, with each claim standing on its own as a separate preferred example of the disclosure.

Other variations are within spirit of present disclosure. Thus, while disclosed techniques are susceptible to various modifications and alternative constructions, certain illustrated examples thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed examples (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one example, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain examples require at least one of A, at least one of B and at least one of C each to be present. In addition, unless otherwise noted or contradicted by context, term "plurality" indicates a state of being plural (e.g., "a plurality of items" indicates multiple items). In at least one example, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one example, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one example, code is stored on a computer-readable storage medium, for example, in form of a computer program comprising a plurality of instructions executable by one or more processors. In at least one example, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one example, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one example, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one example, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one example, different components of a computer system have separate processors and different processors execute different subsets of instructions.

Accordingly, in at least one example, computer systems are configured to implement one or more services that singly or collectively perform operations of processes described herein and such computer systems are configured with applicable hardware and/or software that enable performance of operations. Further, a computer system that implements at least one example of present disclosure is a single device and, in another example, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate examples of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one example, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one example, process of obtaining, acquiring, receiving, or inputting analog and digital data can be accomplished in a variety of ways such as by receiving data as a parameter of a function call or a call to an application programming interface. In at least one example, processes of obtaining, acquiring, receiving, or inputting analog or digital data can be accomplished by transferring data via a serial or parallel interface. In at least one example, processes of obtaining, acquiring, receiving, or inputting analog or digital data can be accomplished by transferring data via a computer network from providing entity to acquiring entity. In at least one example, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A telemetry collection system that monitors a network, the telemetry collection system comprising:
   a communication interface to connect to a first network device and a second network device; and
   one or more processors to:
      assign different time slots for sampling telemetry data to the first network device and the second network device;
      receive the telemetry data from the first network device and the second network device according to the assigned time slots, wherein the received telemetry data comprises:
         first telemetry data of a parameter sampled at the first network device according to a first sampling rate for traffic sent by the first network device to the second network device; and
         second telemetry data of the parameter sampled at the second network device according to the first sampling rate for the traffic received by the second network device from the first network device; and
      combine the first telemetry data and the second telemetry data to form combined telemetry data for the parameter having a resolution that corresponds to a second sampling rate greater than the first sampling rate.

2. The telemetry collection system according to claim 1, wherein the one or more processors are to determine the first sampling rate and the second sampling rate.

3. The telemetry collection system according to claim 1, further comprising:
   the first network device and the second network device, wherein the first and second network devices are comprised of two back-to-back connected network devices.

4. The telemetry collection system according to claim 1, further comprising:
   the first network device and the second network device, wherein the first and second network devices are comprised of a receiver and a transmitter that are connected to each other.

5. The telemetry collection system according to claim 1, further comprising:
   the first network device and the second network device, wherein the first and second network devices are comprised of port counters on each end of a network cable.

6. The telemetry collection system according to claim 1, wherein the second sampling rate is two times greater than the first sampling rate.

7. The telemetry collection system according to claim 1, wherein the one or more processors are to determine that a timing data error threshold of a time window exceeds a predetermined threshold, and then filter out the time window.

8. The telemetry collection system according to claim 1, wherein the one or more processors are to:
   determine a status of the network based on the first telemetry data and the second telemetry data; and
   trigger an alert when the status of the network indicates an error condition.

9. The telemetry collection system according to claim 1, wherein the one or more processors are to assign the different timeslots based on a latency between the first network device and the second network device.

10. The telemetry collection system according to claim 1, wherein the one or more processors are to determine that a deviation between the first telemetry data and the second telemetry data exceeds a threshold, and then exclude the first telemetry data and the second telemetry data from the combined telemetry data.

11. A system comprising one or more processors to:
   assign different time slots for sampling telemetry data to a first network device and a second network device;
   receive telemetry data from the first network device and the second network device according to the assigned time slots, wherein the received telemetry data comprises:
      first telemetry data of a parameter sampled at the first network device according to a first sampling rate for traffic sent by the first network device to the second network device; and
      second telemetry data of the parameter sampled at the second network device according to the first sampling rate for the traffic received by the second network device from the first network device; and
   combine the first telemetry data and the second telemetry data to form combined telemetry data for the parameter having a resolution that corresponds to a second sampling rate greater than the first sampling rate.

12. The system according to claim 11, wherein the one or more processors:
   determine the first sampling rate and the second sampling rate.

13. The system according to claim 11, wherein the second sampling rate is two times greater than the first sampling rate.

14. The system according to claim 11, further comprising:
   the first network device and the second network device, wherein the first network device and the second network device comprise logical counters.

15. The system according to claim 11, further comprising:
   the first network device and the second network device, wherein the first network device and the second network device comprise switches.

16. The system according to claim 11, wherein the one or more processors are to:
   determine that a timing data error threshold of a time window exceeds a predetermined threshold; and
   filter out the time window.

17. The system according to claim 11, wherein the one or more processors are to:
   determine a status of a network based on the first telemetry data and the second telemetry data; and
   trigger an alert when the status of the network indicates an error condition.

18. The system according to claim 11, wherein the one or more processors are to:
   assign the different timeslots based on a latency between the first network device and the second network device.

19. The system according to claim 11, wherein the one or more processors are to:
   determine that a deviation between the first telemetry data and the second telemetry data sampled in respective time slots exceeds a threshold, and then exclude the first telemetry data and the second telemetry data from the combined telemetry data.

20. A method of operating a telemetry device, the method comprising:
   assigning different time slots for sampling telemetry data to a first network device and a second network device;
   receiving the telemetry data from the first network device and the second network device according to the assigned time slots, wherein the received telemetry data comprises:
      first telemetry data of a parameter sampled at the first network device according to a first sampling rate for traffic sent by the first network device to the second network device; and
      second telemetry data of the parameter sampling at the second network device according to the first sampling rate for the traffic received by the second network device from the first network device; and
   combining the first telemetry data and the second telemetry data to form combined telemetry data for the parameter having a resolution that corresponds to a second sampling rate greater than the first sampling rate.

* * * * *